(12) United States Patent
Winks et al.

(10) Patent No.: US 11,402,131 B1
(45) Date of Patent: Aug. 2, 2022

(54) HARDENED SOLAR ENERGY COLLECTOR SYSTEM

(71) Applicants: Renewable Energy Aggregators Inc., Sullivans Island, SC (US); Advanced Fusion Systems LLC, Newtown, CT (US)

(72) Inventors: David Winks, Amissville, VA (US); Curtis Birnbach, New Rochelle, NY (US); Gediminas Campe, Newtown, CT (US)

(73) Assignees: RENEWABLE ENERGY AGGREGATORS INC., Sullivans Island, SC (US); ADVANCED FUSION SYSTEMS LLC, Newtown, CT (US)

( * ) Notice: Subject to any disclaimer, the term of this patent is extended or adjusted under 35 U.S.C. 154(b) by 0 days.

(21) Appl. No.: 17/151,393

(22) Filed: Jan. 18, 2021

(51) Int. Cl.
*F24S 60/30* (2018.01)
*F24S 23/30* (2018.01)
*F24T 10/30* (2018.01)
*F24S 50/40* (2018.01)
*F24S 10/75* (2018.01)

(52) U.S. Cl.
CPC ............ *F24S 60/30* (2018.05); *F24S 10/753* (2018.05); *F24S 23/31* (2018.05); *F24S 50/40* (2018.05); *F24T 10/30* (2018.05)

(58) Field of Classification Search
CPC .......... F24S 60/30; F24S 10/753; F24S 23/31; F24S 50/40; F24T 10/30
See application file for complete search history.

(56) References Cited

U.S. PATENT DOCUMENTS

| | | | | |
|---|---|---|---|---|
| 5,529,054 A | * | 6/1996 | Shoen | F24S 50/20 126/681 |
| 2011/0056485 A1 | * | 3/2011 | Saluccio | F24S 23/30 126/621 |
| 2016/0146508 A1 | * | 5/2016 | Gornik | E04H 4/141 126/561 |
| 2017/0191262 A1 | * | 7/2017 | Forbis | E04B 1/80 |
| 2020/0240654 A1 | * | 7/2020 | Saavedra | F24S 90/00 |

* cited by examiner

*Primary Examiner* — David J Laux
(74) *Attorney, Agent, or Firm* — Leason Ellis LLP

(57) ABSTRACT

A hardened solar thermal energy collector (STEC) system that is adapted to withstand a nuclear detonation or other powerful explosion in the vicinity. The STEC system comprises a plurality of collector tubes arranged side by side in an array that carry and circulate a working fluid, each of the plurality of collecting tubes having an upper radiation collection surface having a diffractive optical structure and a bottom surface, a supporting tray upon which each of the collector tubes is securely mounted, an insulated housing set beneath a ground surface level enclosing the plurality of collector rubes and supporting trays, and a secured underground geothermal storage unit fluidly coupled to the array of collector tubes. The housing, the plurality of collector tubes, and the tray are positioned such that topmost portions thereof are at the ground surface level or below.

18 Claims, 12 Drawing Sheets

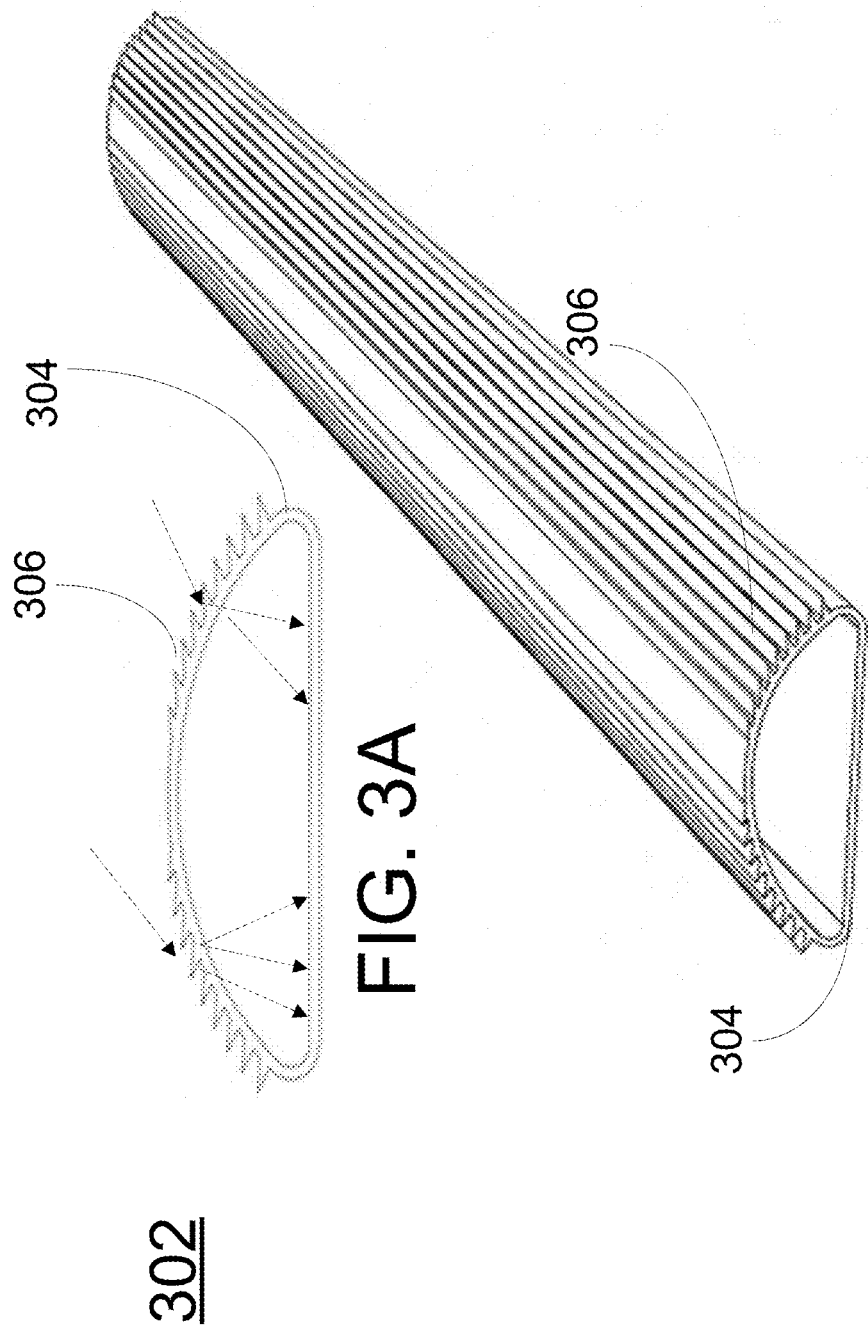

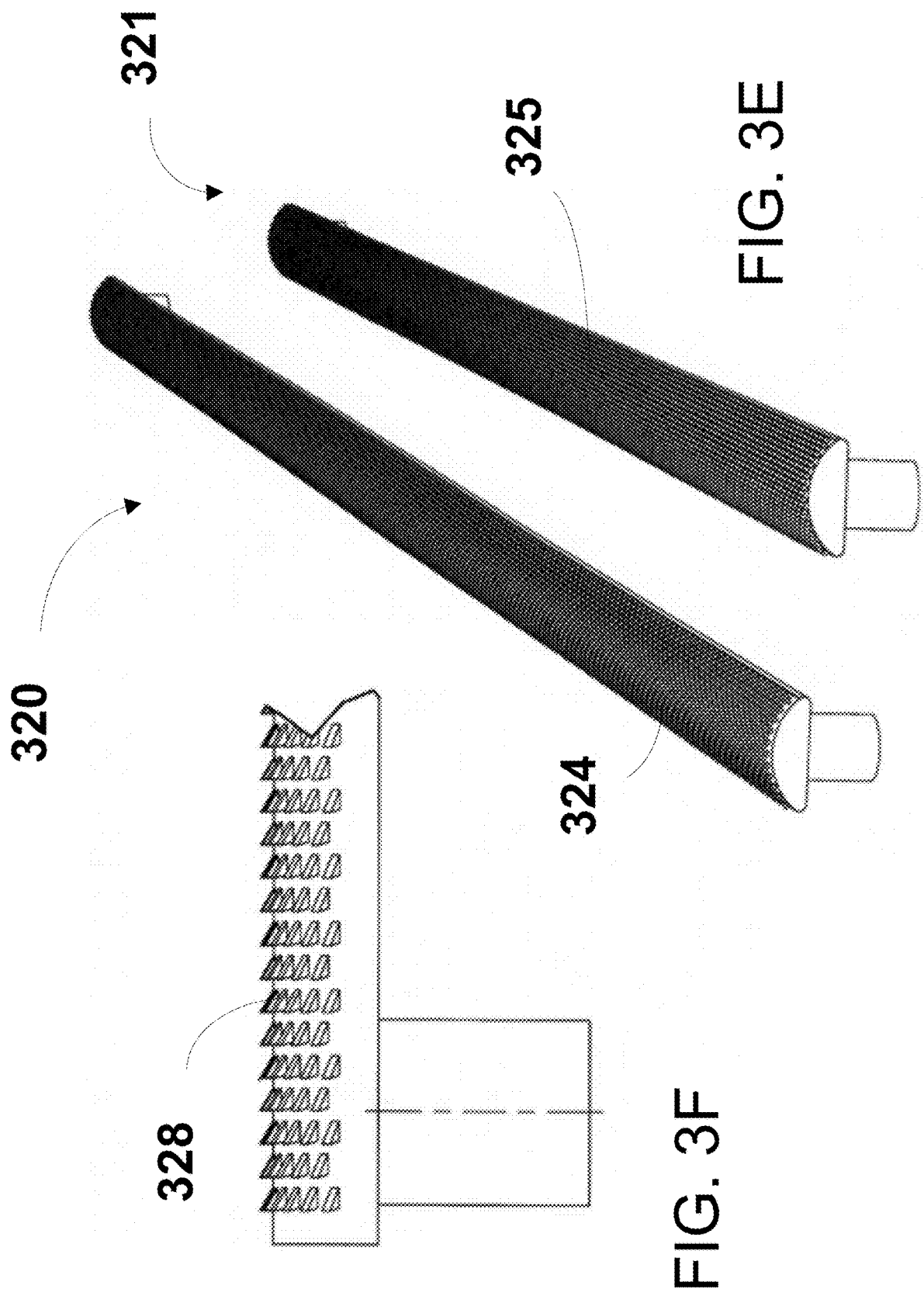

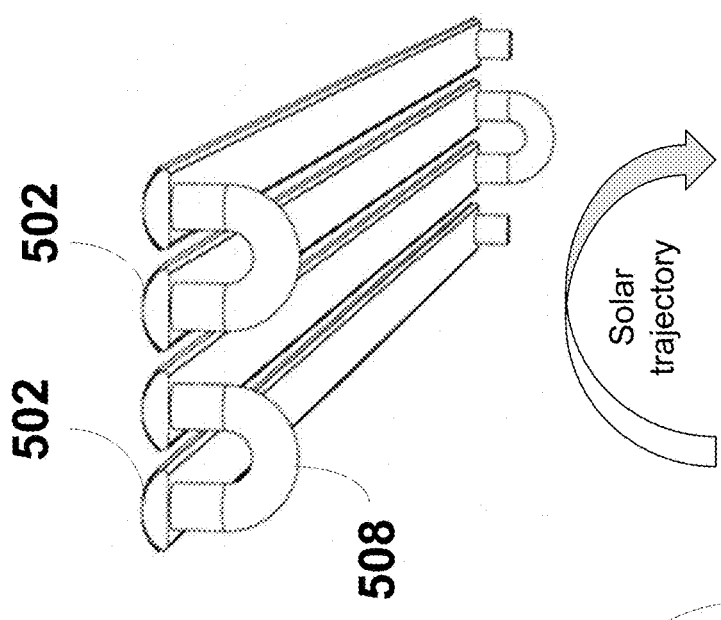
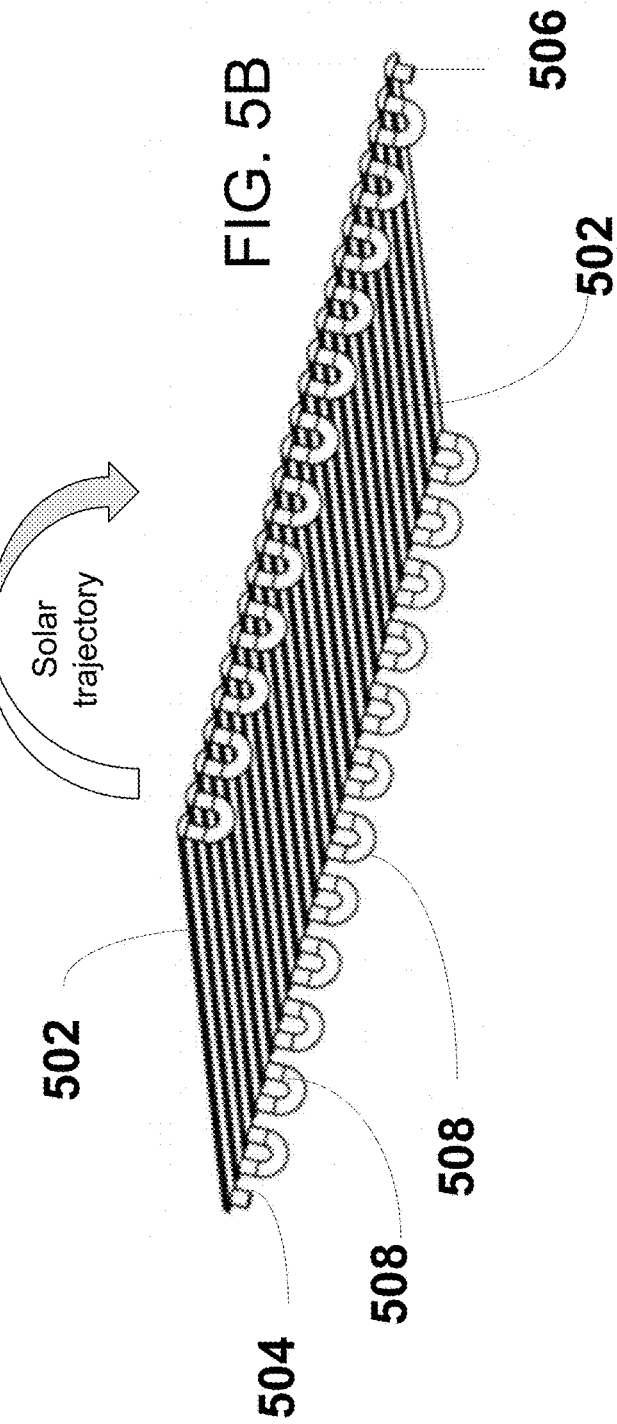

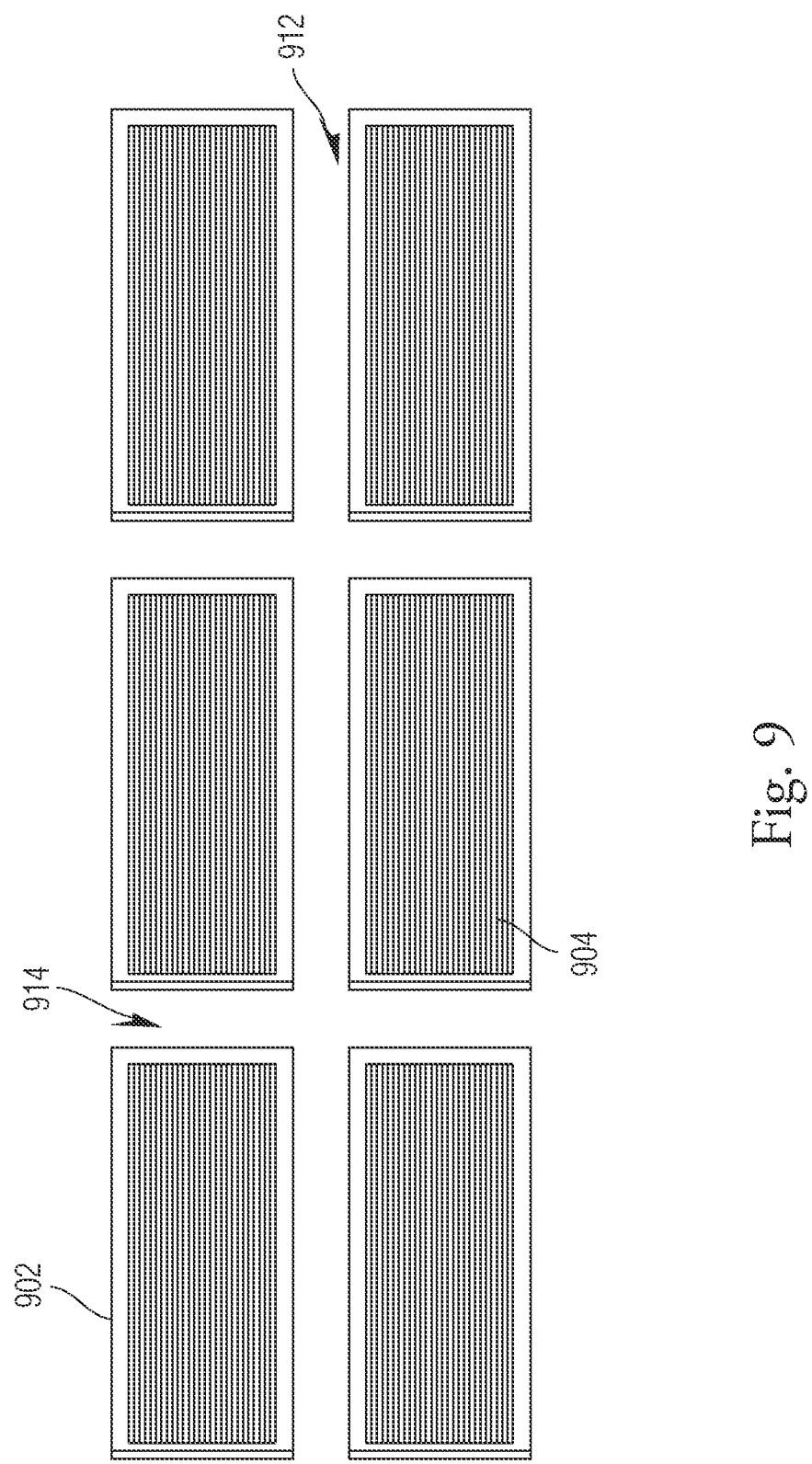

HARDENED SOLAR ENERGY COLLECTOR SYSTEM

FIELD OF THE INVENTION

The present invention relates to a hardened apparatus and system for collecting solar energy, converting it to heated circulating heat transfer fluids and then to electricity. The hardened apparatus and system is designed to withstand nuclear explosions in locations as close as 500 yards from ground zero, dependent on the size of the explosion. A collector design is presented that is then incorporated into a larger system that achieves the design goals.

Definitions

Black Body: A black body is an ideal body or surface that completely absorbs all radiant energy falling upon it with no reflection.

Carnot Cycle: The Carnot cycle is an ideal reversible closed thermodynamic cycle in which the working substance goes through the four successive operations of isothermal expansion to a desired point, then adiabatic expansion to a desired point, then isothermal compression, and finally adiabatic compression back to its initial state Component: an individual electric or electronic element or a plurality of such elements connected in a defined circuit or system.

Delta-t: The difference in temperature between inlet and outlet in a system.

Diffractive Optical Element: A Diffractive Optical Element (DOE) is a form of optical element based on the diffractive properties of light wherein light rays bend a predictable amount when incident on a raised sharp edge or a sharp opaque edge in a transmissive phase optic. Proper geometric arrangement of such edges can produce an optical element which functions in a fashion similar to a refractive lens or diffraction grating. By adjusting the mechanical parameters of the diffraction structure, a wide range of ray patterns can be defined.

Electromagnetic Pulse (EMP): A transient burst of electromagnetic radiation having a fast rise time of typically less than 5 nanoseconds that is hazardous and can produce potentially damaging current and voltage surges (and can thus be considered a subset of hazardous EMI). Typical EMP intensity is in the order of tens of thousands of Volts/Meter. EMP can be produced by a nuclear detonation (NEMP; risetime typically is less than 5 nanoseconds) or by non-nuclear sources that produce a suddenly fluctuating electromagnetic field such as lightning and coronal mass ejections (NNEMP; risetime typically is less than 5 nanoseconds).

Hardened: Secured against the impact of a nuclear or chemical explosion greater than approximately one Kiloton TNT equivalent.

Heat tracing: Heat tracing is a term of art which relates to means of protecting plumbing and other objects that are selectively heated during periods when the outside air temperature is near or below the freezing point to prevent freezing of liquids within the system and accumulations of ice and snow.

Holographic Optical Element: A Holographic Optical Element (HOE) is a special case of Diffractive Optical Elements wherein the diffractive structures are arranged in such a fashion as to form a hologram which causes a more complex pattern or even an image to be formed at some distance (small or large) from said diffractive edges.

Infra-red portion of Spectrum: The Infra-red portion of the optical spectrum covers the frequency range from red (generally taken to have a wavelength longer than 575 nanometers) to the millimeter wave portion of the band (around 100 gigahertz).

Linear Oven: A collector in which Solar Thermal Energy Collector Arrays (see below) are mounted in a reflective, grounded thermally insulated five sided open box (tray), where said Solar Thermal Energy Collector and tray is mounted flush with the surface of the ground at the installation site to provide wind resistance, thermal insulation, mechanical support, and to increase thermal efficiency of the system. The tray is mounted at a slight angle from horizontal to allow for drainage through plumbing connections provided for that purpose.

Post-nuclear Attack Environment: The Post-nuclear attack environment is that which occurs in the immediate and subsequent aftermath of a nuclear explosion or explosions in a given geographic region.

Rankine Cycle: Rankine cycle is an idealized thermodynamic cycle of a heat engine that converts heat into mechanical work while undergoing phase change. It is an idealized cycle in which friction losses in each of the four components are neglected. The heat is supplied externally to a closed loop, which usually uses water as the working fluid. It is used to study the performance of turbines and reciprocating steam engines.

Solar Energy Collector: A Solar Energy Collector (SEC) is a device which collects light rays from the sun at some predetermined range of frequencies with the purpose of extracting energy from said rays. The frequency range determines the methods in which the energy is extracted. This class of devices includes photovoltaic as well as circulating heat transfer fluid-based designs.

Solar Thermal Energy Collector: A Solar Thermal Energy Collector (STEC) is a special case of Solar Energy Collector wherein the frequency range is optimized for the infra-red portion of the spectrum. Most prior art STECs incorporate some form of tracking to enable optimal orientation of the collector relative to the incident angle of rays from the sun. It is noted that other portion of the incident spectrum are also converted to heat according to their specific thermal content.

Stirling Cycle: The Stirling cycle is a well known thermodynamic cycle that allows conversion of a difference in temperature (delta-t) of a working fluid to motion (usually a piston) and consists of four thermodynamic processes acting on the working fluid: I. Isothermal heat addition (expansion); II. Isochoric heat removal (constant volume); III. Isothermal heat removal (compression)' and IV. Isochoric heat addition (constant volume).

TEMPEST: A United States government technical standard for hardening systems against the effects of nuclear explosions. In the context of this patent application, the definition shall be expanded to include all other US Government standards relating to the hardening of electronic and communication systems, including but not limited to, MIL 188-125, Mil 461, Mil 464, MIL 2963, etc. For the purposes of this document, TEMPEST also includes other standards and protocols for hardening equipment against nuclear explosions and the stresses imposed therein.

Working Fluids: Also known as heat transfer fluids, they are a liquid or gas which is used in a thermal engine to transfer energy from one location and form to another. A simple example is water mixed with anti-freeze (typically ethylene glycol) as is used on the radiator and cooling system of internal combustion engines. Ideally, a phase change should occur as this allows greater efficiency in the transfer of energy, but it is not an absolute necessity. Examples of working fluids include, but are not limited to, water/antifreeze, Freon, ammonia, butane and other hydrocarbon gasses, liquid sodium, hydrogen, helium, and many others. The choice of which working fluid to use requires examination of the available thermal energy and required delta-t of the thermal cycle chosen for the energy conversion step.

BACKGROUND DESCRIPTION OF THE RELATED ART

Prior art in this area can be found in various solar energy collector art units. Solar Energy Collectors are optical systems with a large collection area which are designed to extract energy from incident sunlight at some range of frequencies. Many SEC's are photovoltaic in design wherein the interaction of incident photons with a semiconducting crystal structure produces an electrical current directly. Another form, which is the art area of the current invention, is the Solar Thermal Energy Collector (STEC) wherein an optical collection system is optimized to collect energy from the infra-red portion of the spectrum. They typically consist of some form of reflector and a conveyance means for exposing a liquid or gaseous heat transfer medium to the focused rays of infra-red light from the sun. These systems are physically fragile and are not hardened or optimized to operate in the difficult nuclear and post-nuclear attack environment. Semiconductor devices are not considered appropriate for this application due to their known damage sensitivity to ElectroMagnetic Pulse (EMP) as well as their physical fragility due to the brittle nature of said devices. Many of these systems incorporate tracking mechanisms which are considered vulnerable in the nuclear and post-nuclear attack environment. Furthermore, many of these prior art systems are mounted above ground at locations where they would most likely be swept away by the high winds or melted by the instantaneous thermal pulse of said attack.

FIG. 1 shows a cross-section of a solar energy thermal collector according to the prior art. This design uses a cylindrical collector tube (106) located near the bottom of an angled optical reflector (108). A collection lens (114) focuses incoming radiation toward the collector tube (106). The collector tube (106) is mounted on thermal insulators (104) at or near the focus of the reflector (108). A liquid heat transfer medium (not shown) circulates through the collector tubes (106) and provides a source of heated liquid which can be used to run a turbine (not shown), for example.

SUMMARY OF THE INVENTION

The present disclosure describes a hardened solar thermal energy collector (STEC) system that is adapted to withstand a nuclear detonation or other powerful explosion in the vicinity. The STEC system comprises a plurality of collector tubes arranged side by side in an array that carry and circulate a working fluid, each of the plurality of collecting tubes having an upper radiation collection surface having a diffractive optical structure and a bottom surface, a supporting tray upon which each of the collector tubes is securely mounted, an insulated housing set beneath a ground surface level enclosing the plurality of collector rubes and supporting trays, and a secured underground geothermal storage unit fluidly coupled to the array of collector tubes. The housing, the plurality of collector tubes, and the tray are positioned such that topmost portions thereof are at the ground surface level or below.

Embodiments disclosed herein also include a hardened solar thermal energy collector apparatus adapted to withstand a nuclear detonation or other powerful explosion in the vicinity. The apparatus comprises a plurality of collector tubes arranged side by side in an array that carry and circulate a working fluid, each of the plurality of collecting tubes having an upper radiation collection surface having a diffractive optical structure and a bottom surface, a supporting tray upon which each of the collector tubes is securely mounted and an insulated housing set beneath a ground surface level enclosing the plurality of collector rubes and supporting trays. The housing, the plurality of collector tubes, and the tray are positioned such that topmost portions thereof are at the ground surface level or below.

In another aspect, the present disclosure provides a method of operating a hardened solar thermal energy collector (STEC) system that includes a plurality of collector tubes arranged side by side in an array that carry and circulate a working fluid, each of the plurality of collecting tubes having an upper radiation collection surface having a diffractive optical structure and a bottom surface, an insulated housing set beneath a ground surface level enclosing the plurality of collector rubes, and a secured underground geothermal storage unit fluidly coupled to the array of collector tubes via piping interconnects. The method comprises detecting physical parameters of the working fluid in the geothermal storage unit and regulating flow of the working fluid between the array of collector tubes and the geothermal storage unit, as well as between the geothermal storage unit and a turbine to which the geothermal storage unit supplies heated working fluid, based on the detected physical parameters of the working fluid.

These and other features can be appreciated from the accompanying description of certain embodiments of the invention which are discussed in relation to the accompanying drawing figures.

BRIEF DESCRIPTION OF THE DRAWINGS

FIG. 3a is a cross-sectional view and projection of an embodiment of a collector tube having longitudinally arranged diffractive optical elements according to the present disclosure.

FIG. 3b is a perspective view of the embodiment of a collector tube having longitudinally arranged diffractive optical elements according to the present disclosure.

FIG. 3e is a perspective view of a collector tube having a rasp-shaped diffractive optical element according to an embodiment of the present disclosure.

FIG. 3f is a partial top perspective view of a tube collector showing rasp-shaped diffractive optical elements.

FIG. 5a is a perspective view of a portion of a collector array according to an embodiment of the present disclosure.

FIG. 5b is a perspective view of an embodiment of an array of collector tubes with interconnecting pipes illustrating a typical number of tube elements.

FIG. 9 is a plan view of a group of collector arrays in an exemplary facility according to an embodiment of the present disclosure.

Further features and advantages of the invention will become apparent from reading the following detailed description in conjunction with the following drawings, in which like reference numbers refer to like parts. The drawings and portions thereof are illustrative and are not necessarily drawn to scale, nor do they represent all possible derivations of the current invention.

DETAILED DESCRIPTION CERTAIN OF EMBODIMENTS OF THE INVENTION

In order to provide continuous electrical power supply to defense, government and other societally critical installations in near proximity to a nuclear attack or other powerful explosions (typically 0.5 miles or greater, dependent on the yield of the nuclear device or devices involved) before, during, and after said nuclear attack, it is necessary to have equipment configured in such a fashion that will withstand the known forces placed on them by said attack. The forces include, but are not limited to: thermal shock, mechanical shock, severe wind (in excess of 100 mph), gamma and x-ray pulse exposure, and electromagnetic pulse (EMP) exposure.

Figure 1:
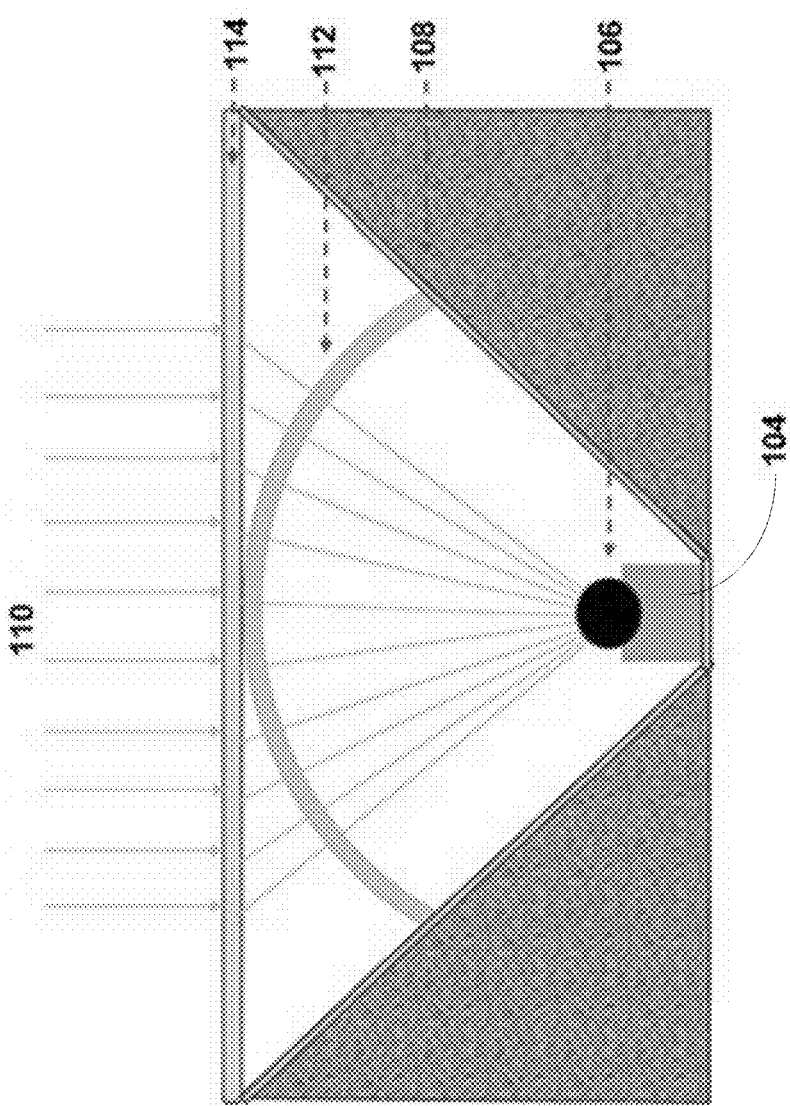
FIG. 1 is a cross-sectional view of conventional solar collector according to the prior art.
Figure 2:
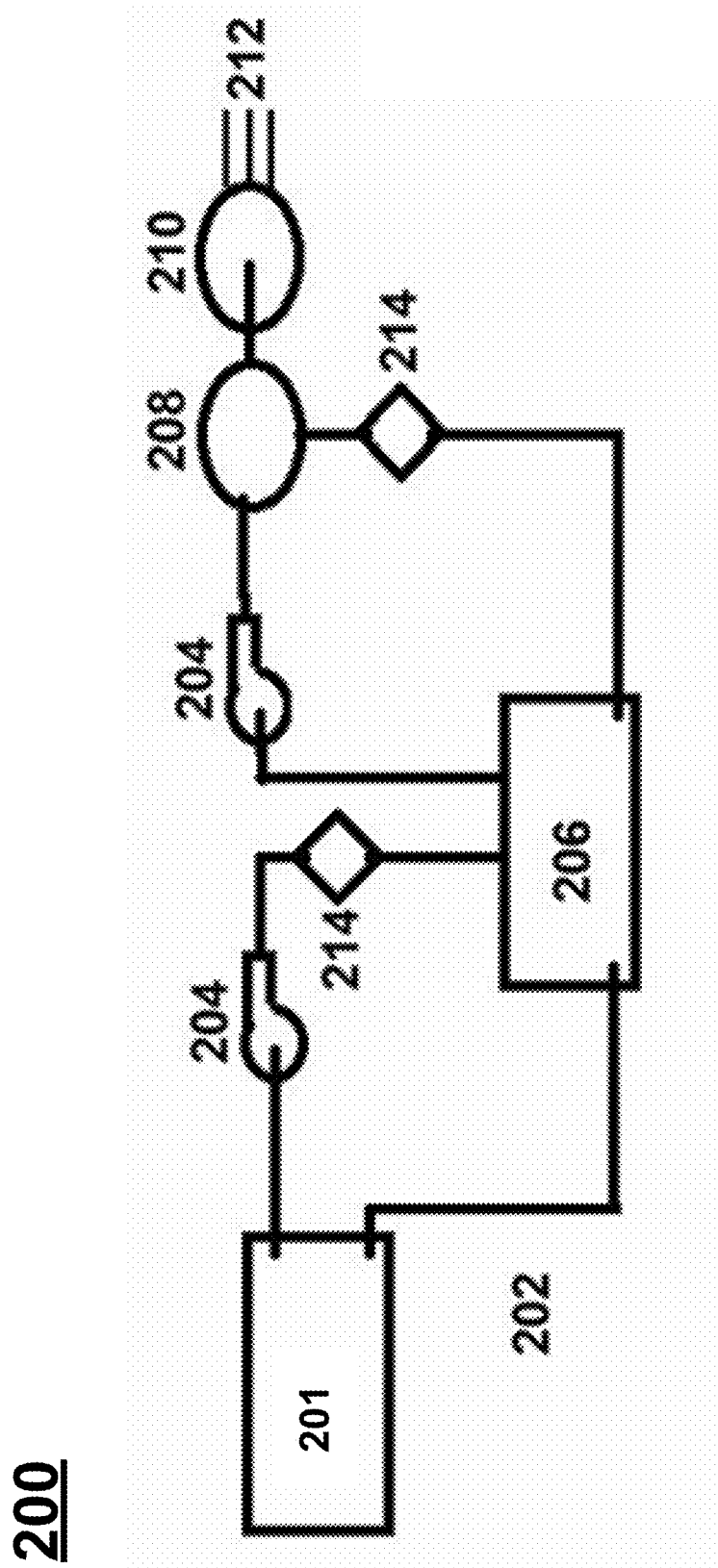
FIG. 2 is a block diagram of a Hardened Solar Energy Collector System according to an embodiment of the present disclosure.

The current invention addresses these known limitations and weaknesses by providing a hardened Solar Thermal Energy Collector (STEC) system, which will be referred to below as a "STEC system". The STEC system is mechanically and electrically resistant to the effects of proximal explosions and is designed to provide continuous production of electricity and circulating heat transfer liquids before, during, and after a proximal nuclear or other explosion FIG. 2 is a block diagram of an embodiment of a STEC system according to the present disclosure. Hardened Solar Energy Collector System ("system") according to an embodiment of the present disclosure. The STEC system (200) includes a hardened collector array (201) that includes collector tubes as described below. The collector array (201) is coupled to both an underground geothermal storage unit (206) via two paths, and external usage loads for excess hot heat transfer fluids such as buildings, etc. A first path connects the collector array (201) to the underground geothermal storage unit (206) simply by interconnecting insulated piping (202). In the second path, the collector array is coupled to the underground unit through a circulating pump (204) and expansion tank (214) positioned in insulated piping (202). A plurality of actuator valves (not shown in FIG. 2; see FIG. 6) are positioned within the piping and/or elements of the system to regulate the flow of the working fluid through the system.

The underground storage unit is also coupled to a turbine (208) via two paths, a first path through insulating piping containing a recirculating pump (204) and a second path through insulating piping containing an expansion tank (214). Together, the recirculation pumps (204) provide redundant pumping means for circulating the working fluids. The turbine (208) produces mechanical energy from the thermal energy providing by the heated working fluid. The turbine (208) is in turn coupled to an electrical generator (210) through which the mechanical energy produced by the turbine is converted into electrical energy. The generator may be either an AC or DC design, depending on the nature of the facility load. In some embodiments, the generator (210) can output alternating voltage/current via a three-phase AC output (212). A system of valves (not shown) allows routing of the working fluid and isolation of various components. This allows the underground geothermal storage unit (206) to provide heat for the collector array (201) for deicing, to the generator (210) for electricity generation, and to external facilities for heating or some combination of the above, Thus, depending on geographic location, array size limitations, and choice of thermal cycle, a generation system is attached to the STEC system as described above. This system incorporates a number of other functions and features to enable it to meet the requirement of continuous operation before, during and after a proximal nuclear explosion event. The STEC system thereby provides a means for converting the thermal energy of a circulating working fluid to electricity on a continuous basis. This can be accomplished by application of any of several known thermal cycles such as, but not limited to, the Rankine Cycle, the Carnot Cycle, the Sterling Cycle, etc. The choice of cycle is governed by the thermal efficiency of the array system. This is further dictated and/or modified by the geographic location of the system itself, as locations in different latitudes have different average daily solar irradiance which in turn effects the magnitude of the delta-t, the difference in temperature between inlet and outlet pipe in the collection array.

The generator (210) can be driven by a turbine as depicted, or alternatively by a Stirling engine, an OTEC engine, or any other compatible generation equipment. To meet the other requirements, the turbine (208) and generator (210) must be EMP-protected in accordance with TEMPEST standards as defined herein. The generator (210) and its ancillary equipment is located underground in shielded rooms and is connected by shielded underground power transmission lines to shielded underground AC or DC power transmission equipment through the use of shielded underground substations or conversion stations for transmission to the load. All aspects of the underground facilities are shielded in accordance with TEMPEST standards as defined herein. Such shielding is typically made from continuously welded steel or aluminum, or copper, and incorporates a low impedance grounding sub-system to remove any induced voltages quickly to ground. The enclosed steel rooms for the generators are welded to a series of typically 6-inch wide stainless steel straps, uniformly spaced around the perimeter of the enclosure, typically on a 4 to 6 foot spacing, that are in turn welded to a low impedance grounding grid least 6 feet below the structure. The grounding grid can be a matrix of crossed wires, welded at each intersection or can be made from large continuous flat sheets or some combination therein. The grid can be made of copper or stainless steel. While copper has better conductivity, stainless steel is less expensive and more resistant to corrosion in the underground environment. It is noted that a larger area of stainless steel is needed to get an equivalent grounding area to copper. These stainless steel sheets are welded together forming a flat ring that protrudes horizontally outward from each side of the structure by typically a minimum 6 feet.

To prevent damage to the underground system by incursion of EMP through any openings for cooling the generators and sub-stations, air ducts for the electrical generation facility can include blast valves below the surface, honeycomb filters using a 10:1 aspect ratio (e.g. ½" diameter holes drilled in 5-inch thick steel plates that are sized to the air flow requirements), and HEPA (High Efficiency Particulate Absorbing) filters for particulates. Such honeycomb air filters are well known and are described in MIL Spec 188-125.

The collector array comprises a plurality of solar thermal energy collector tubes that are semi-elliptical in cross-section and on the upper surface have a diffractive optical structure etched or otherwise fabricated on the surface to form a raised shard-edged structure containing a plurality of diffractive optical elements. The hollow central portion of the collector tubes is supplied with, carries and circulates a working fluid as defined above. The collector tubes have a flat lower surface for mounting purposes which also incorporates plumbing connections for construction of the STEC array. The use of bottom surface plumbing connections provides a means of allowing the array elements to be closely spaced to maximize the number of square feet of array per square feet of installed system. See FIGS. 5b and 5c. The diffractive optical structure directs potentially off-axis incident light rays at any frequency inwardly toward a collecting surface of the array which would other tend to pass over or glance across the surface of the collector element. These diffractive structures can be implemented using any of several designs including linear raised edges, curved edged structures, and more complex shapes including those in the form of a holographic optical element directly formed on the surface of the collector tube. The choice of a semi-elliptical cross-section for a preferred embodiment of the collector tubes is chosen to maximize efficiency. It will be understood that other cross-sectional shapes can also be used, such as a circular or square cross-section, with an expected and predictable loss in efficiency. The tube surfaces are coated to increase absorption of thermal energy with a flat black coating, such as black anodized in the case of aluminum is an appropriate coating for this application. The coating must minimize reflections which would waste energy and maximize absorption for maximum efficiency. This coating can be optimized based on the material that the collector tube is made from.

Referring to FIGS. 5a, 5b, and 5c, FIG. 5a is a longitudinal perspective view of a portion collector array (500) and FIG. 5b is a transverse perspective view of an embodiment of a complete hardened solar collector array (500) according to the present disclosure. As depicted, the array (500) includes a plurality of hardened collector tubes (502) arranged in a side by side fashion to form an array. There is a small space between each of the adjacent collector tubes to allow for water drainage. Interconnect pipes (508) positioned underneath the collector tubes fluidly couple adjacent collector tubes to each other. At the bottom of the array (500) is a pipe connection (504) which couples the array via an interconnect pipe to the recirculation pump (204) of the SPEC system. At the other end of the array (500), also on the bottom surface, is another pipe connection (506) which couples the array directly to the underground storage unit. Each collector tube (502) is securely mounted on a tray.

Figure 8A:
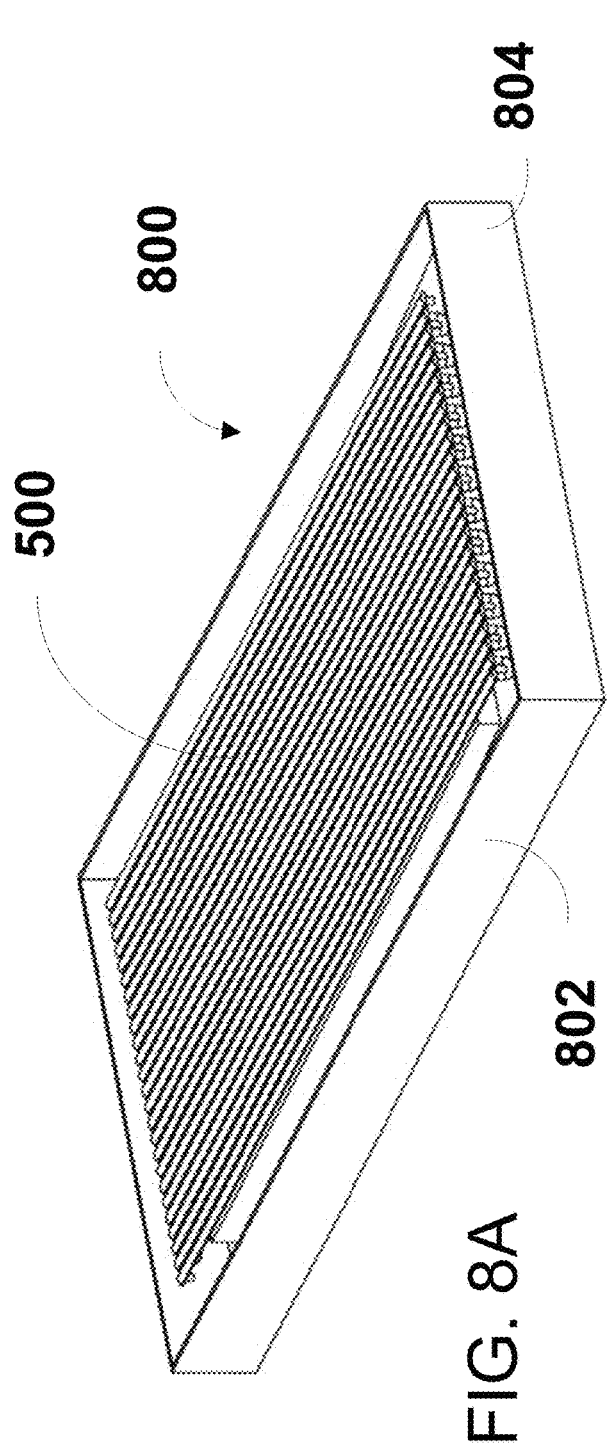
FIG. 8a is a perspective view of a collector tube array positioned within a secure insulated housing according to an embodiment of the present disclosure
Figure 8B:
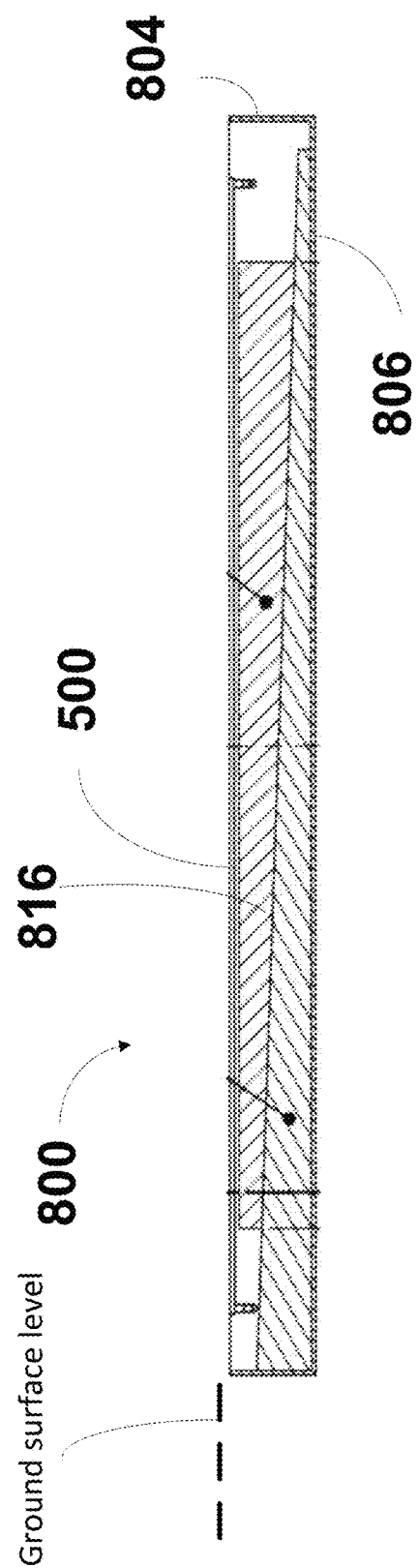
FIG. 8b is a cross-sectional side of the collector tube array within the insulated housing according to an embodiment of the present disclosure.
Figure 8C:
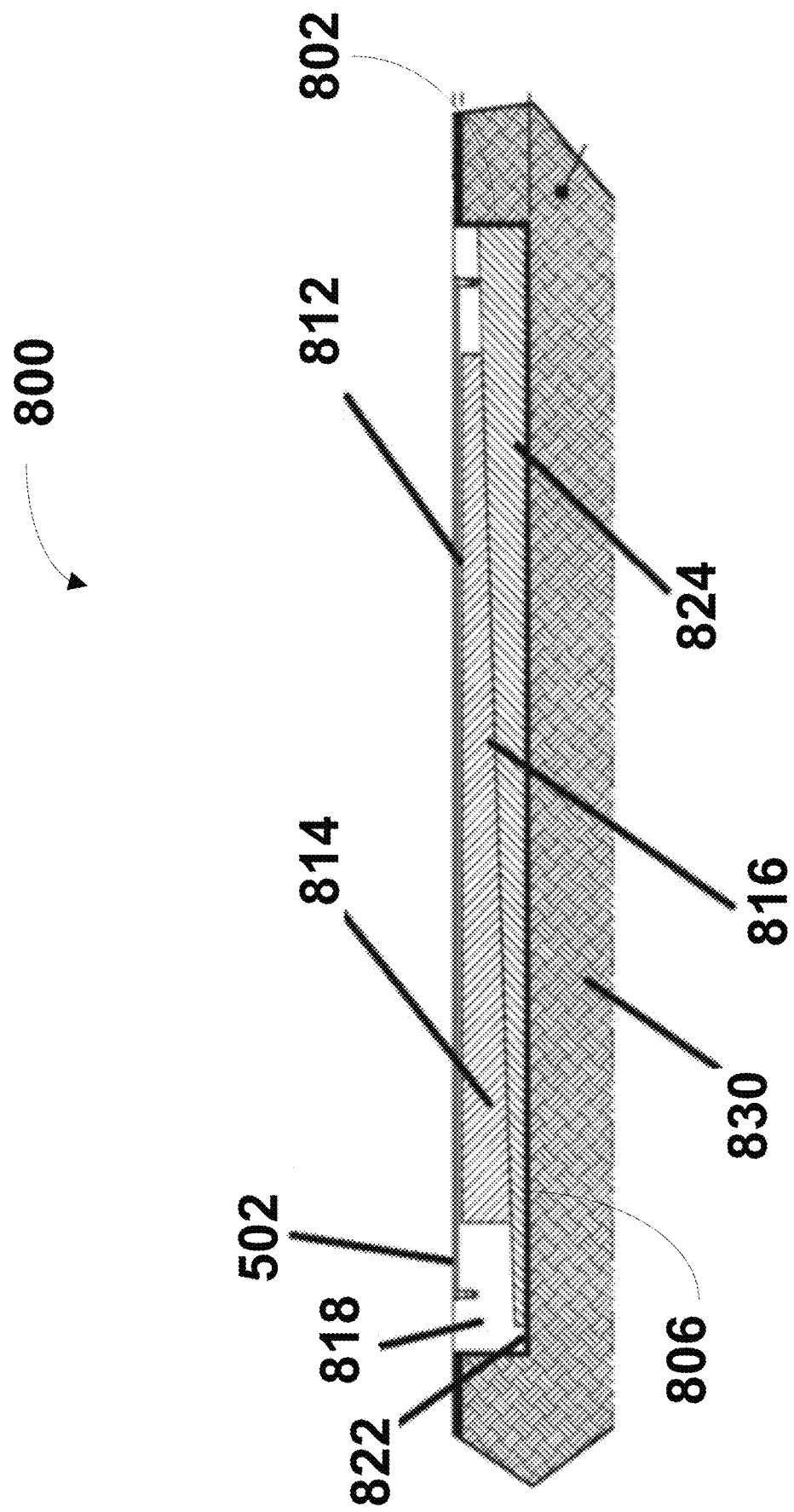
FIG. 8c is a longitudinal cross-sectional view illustrating features of an embodiment of an insulated housing assembly in greater detail.

The array elements (502), (504), (506), (508) are set in a thermally and electrically insulating housing (800) which is shown in FIGS. 8a-8c. The housing (800) is a metallic structure (preferably stainless steel) that includes side walls (e.g., (802), (804) and bottom (806) but is open at the top. The top of the walls (802), (804) of the housing (800) and the array elements are flush with the ground surface level (or, in the case of the array element, just below the ground level). Having the walls and array elements at ground surface level provides protection from severe cross winds known to be associated with proximal nuclear or chemical explosions. Wash nozzles for cleaning the array are positioned on the ground surface adjacent to the housing.

FIG. 8c is a longitudinal cross-section showing a collector array and housing assembly according to an embodiment of the present invention. As shown, at the top of assembly, a collector tube (502) is identified, although it is understood that the assembly includes an array of collector tubes. The collector tube (502) is positioned at or under the ground surface level and is exposed to solar radiation. Directly underneath and supporting the collector tube (502) is a insulating layer (812) which can be made of an insulating mineral such as mica, which provides both heating and electrical insulation and minimizes heat loss to the surrounding ground. A concrete pedestal (814), which provides firm support for the collector tube array, is situated beneath the insulating layer (81). The concrete pedestal (814) has a wedge shape because it is positioned between the horizontal insulating layer (812) and an inclined metal tray (816). The tray (816) is inclined to drain water that seeps through the spaces between the collector tubes toward a drainage area (818). The drainage area leads to a sump (822) which is coupled to a drain pipe (not shown) for carrying water that seeps between the collector tubes away from the housing structure. The space between the tray (816) and the bottom of the housing (806) is filled with a filler material (824) which provides a solid ballast again impacts, such as sand. As shown, the entire housing assembly (800) is surrounded on all sides except the top by ground soil (830). The structural layers of the housing assembly (800) provide sufficient strength and structural integrity to withstand nuclear detonations and other powerful explosions.

The collector tubes (502) are arranged in a closely stacked form, with only a minimal spacing between tubes to allow rainwater to drain off the surface of the collector array. More specifically, the spacing between collector tubes (502) is typically between 0.5 and 1 inch, although it is recognized that many other spacings will work as long as a means for eliminating water that collects on the surface of the array is provided. The preferred embodiment has the plumbing connections mounted to the bottom surface of the array which is the configuration which allows the closest spacing of array elements. The interconnection piping (508) between adjacent array elements may be solid pipe or flexible metal bellows. The collector array as a whole is fixed mounted and does not track the sun. When installed, the long axis is oriented such that it is perpendicular to the trajectory of the sun as it passes over the array (see FIG. 5b). The removal of tracking mechanisms eliminates the fragility associated with any mechanical solar tracking mechanism. The tracking function is provided by the diffractive surfaces positioned on the appropriately oriented collector tubes.

Additionally, as noted, the collector tubes (502) are formed in the shape of an ellipse or semi-ellipse (in cross-section) with a high aspect ratio and a flat bottom surface, meaning that their width dimension is much greater than their height dimension. As mentioned above, each of the collector tubes (502) has, on their respective upper surfaces, a diffraction optical structure including a plurality of diffractive optical elements (DOEs) of some type and a coating to maximize black body energy absorption. The DOEs include a plurality of small sharp edges that cause incoming radiation that strikes the elements to diffract. The DOE structures may be oriented either along the long axis of the collector tube or perpendicularly to the long axis, dependent on specifics associated with the geographic location of the installation and the specific method of manufacture of the array element.

FIG. 3a shows cross-section of a first embodiment of an individual collector tube (302) according to the present disclosure. The collector tube (302) has a collector surface (304) having longitudinal ridges (306) which collectively form a diffractive optical structure that redirects incoming off-axis radiation to into the collector to heat the working fluid therein. FIG. 3a also illustrates schematically how optical rays at various angles of incidence are diffracted onto the collection surfaces. FIG. 3b is a perspective view of the embodiment with longitudinal ridge DOEs which better illustrates the longitudinal alignment of ridges (306).

Figures 3C, 3D:
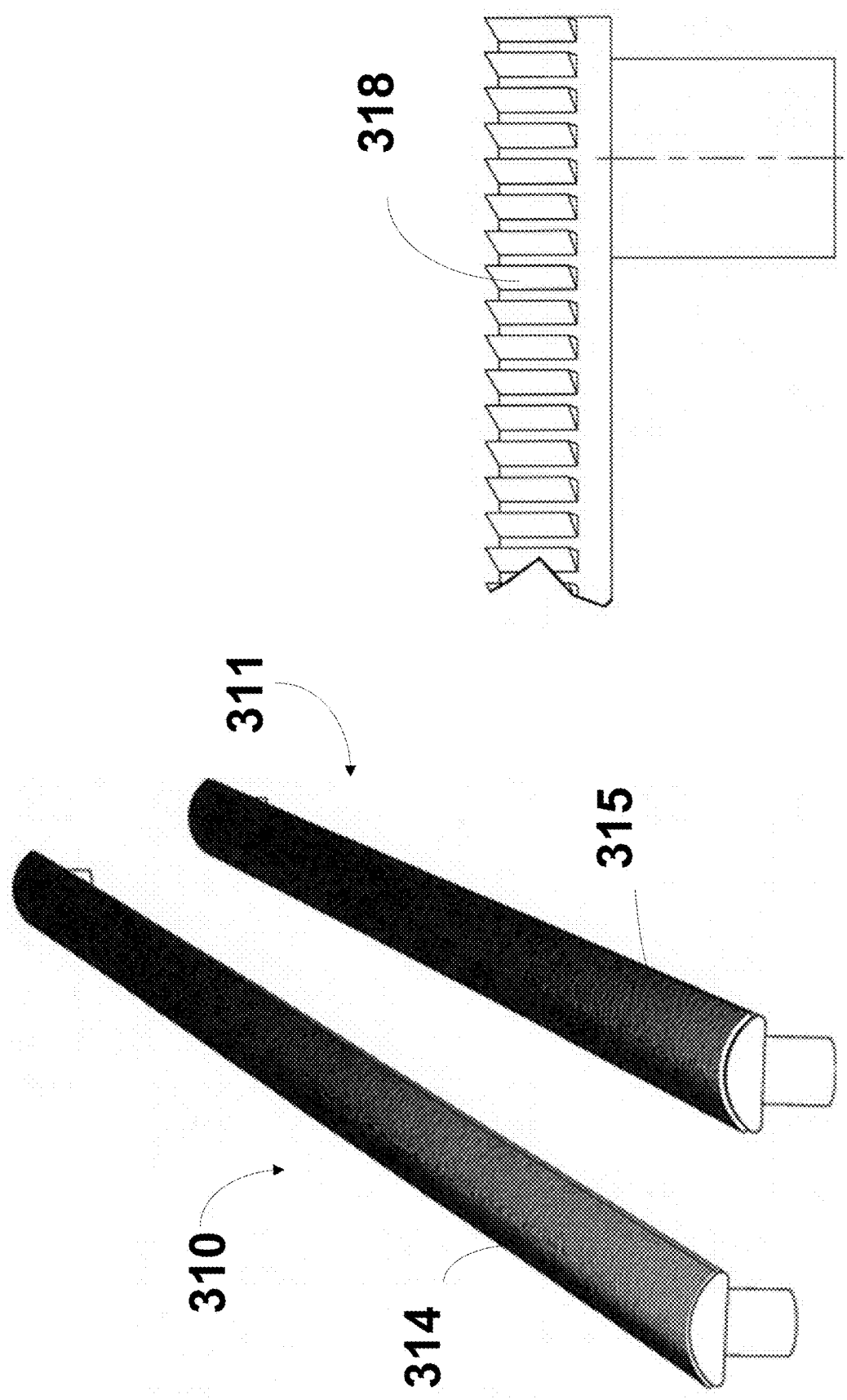
FIG. 3c is a perspective view of tube collectors having transversely arranged diffractive optical elements according to an embodiment of the present disclosure.
FIG. 3d is a partial top perspective view of a tube collector showing transversely arranged diffractive optical elements.

FIGS. 3c and 3d depict a second embodiment of a collector tube design according to the present disclosure. FIGS. 3c and 3d show collector tubes (310), (311) having respective collector surfaces (314), (315). In this embodiment, the collector surfaces include a plurality of transversely oriented ridges (318) shown more clearly in FIG. 3d._In another embodiment shown in FIGS. 3e and 3f depict another embodiment of a collector rube in which collector rubes (320), (321) have collector surfaces that include a plurality of rasp-shaped diffractive optical elements (328). This embodiment is further optimized for optical diffraction purposes and provides a number of benefits. It is also an easy shape to manufacture in high volume even on a curved surface.

Figure 4A:
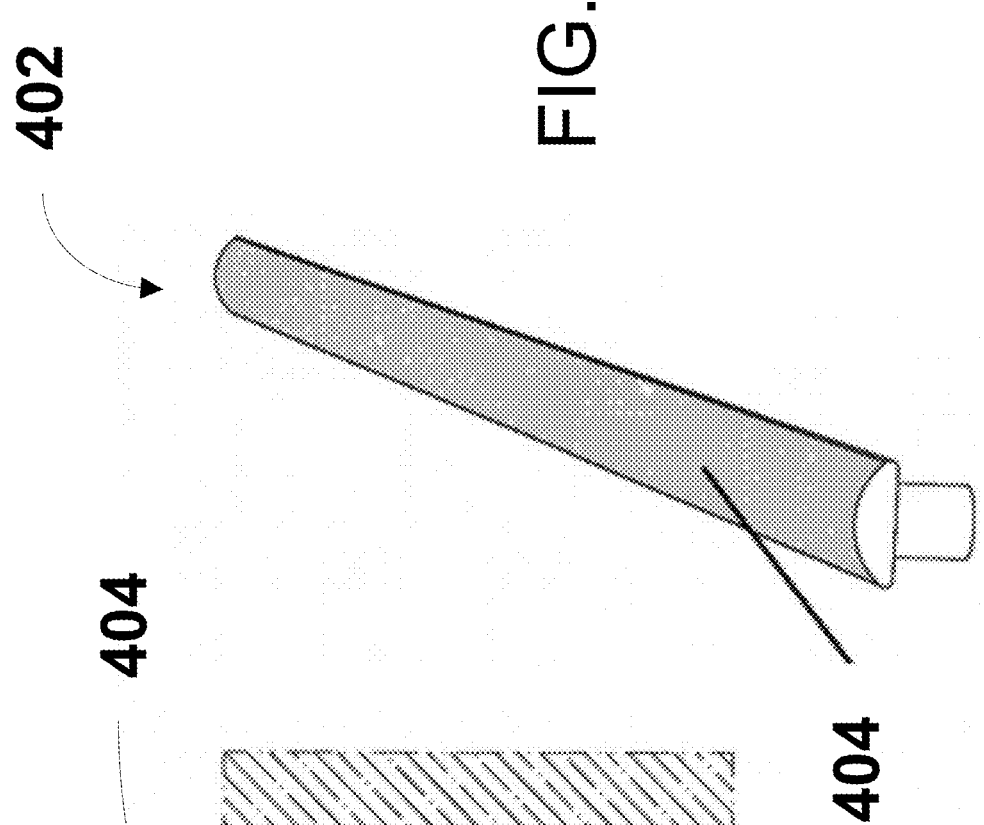
FIGS. 4a and 4b are a cross-sectional view and projection, respectively, of an embodiment of the collector that employs a holographic optical element.
Figure 4B:
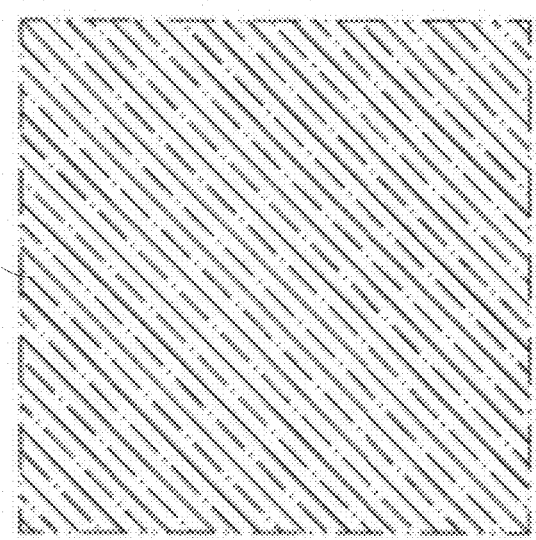

In some embodiments, the diffractive optical elements can comprise holographic optical elements. FIG. 4a shows a perspective view of an embodiment of a collector (402) that includes a holographic optical element (404). An exemplary patterned holographic optical element is shown in FIG. 4b. The DOEs help ensure that all light incident at any angle on said structure is deposited onto the surface of the tube collectors, and thus transfer the incoming thermal energy to the circulating heat transfer fluid within the piping.

It is noted that when solar radiation is incident from overhead of the STEC, the DOEs have less impact than when the light is incident at an angle. Many prior art systems for solar energy collection utilize mechanical tracking mechanisms to maintain a specific orientation of the array relative to the incident angle of the sunlight. These mechanisms are fragile and will not stand up to the forces of a proximal nuclear explosion, which is a mandated design parameter of the present system. The disclosed tube collectors eliminate the need for such mechanisms as well as reflectors and lenses, and thus provide a mechanically robust structure capable of surviving in the specified design environment.

DOEs may be formed through a number of different processes. For example, the DOEs can be formed by chemical or plasma etching of masked regions on the top surface of the tube collectors, physical machining using rotary cutting and forming tools, pressing or stamping against a shaped and hardened die, etc. Another method of manufacture of linear diffractive ridges includes a combination of extrusion followed by a sharpening step. The basic profile is incorporated into the extrusion die and then, in a secondary operation, any one of a number of techniques for sharpening the diffractive ridges may be employed. A specific formation process is selected based on the amount of STEC required to be produced, the base metal of the STEC, the time available for production, as well as other factors which pertain to the type of diffractive structure chosen. In one advantageous embodiment, a longitudinal linear grating structure can be produced easily and efficiently in processes that yield large quantities.

The National Solar Radiation Data Base (NSRDB), a publication of the National Renewable Energy Laboratory (NREL), a branch of the United States Department of Energy, teaches that the contiguous 48 states receive between 4 and 7 kWhrs/m$^2$/day of solar radiation. One acre is equal to 16188 square meters and would thus produce approximately 68 kW$_{thermal}$hrs/day. Thus a 1000-acre array would thus produce at least 68 MegaWatt$_{thermal}$hrs/day under typical conditions. It is necessary to allow several acres of space for the generating, pumping and ancillary equipment to make the array a functional generating station. Excess array capacity will also allow for full rated power output during cloudy days. Many prior art devices incorporate lens and reflectors to concentrate this light, but the incident energy per unit area constitutes the upper limit of the energy can be extracted. The collector arrays system disclosed herein are adapted to take a different approach to maximizing extraction and are designed to maximize collector area rather than received light per unit area. Instead of having a smaller number of tubes widely separated and using lenses or reflectors, the arrays incorporate a large area of collectors with minimal space between them. It is recognized that while this arrangement may not be mathematically the optimum approach in terms of efficiency, the collector array design disclosed system has the distinct advantage of enabling solar energy collection devices that are mechanically strong enough to withstand the rigors of proximal nuclear explosions. This advantage is crucial for certain high-priority applications.

Within the array, the collector tubes (502) are mounted against the bottom of the collector tray on a thermally and electrically insulated layer. Flexible piping interconnects (508) are may be placed between individual collector tubes to enable for differential motion within the array, so as to provide shock absorbing capability for withstanding motion induced by a proximal explosion. By mounting the collector array on a thermally and electrically insulating layer on the bottom of the collector tray, a means is provided for absorbing downward pressure that would be impressed upon the array during a proximal explosion of any type. The use of electrically insulating material in the insulating structure (812) allows for the array to be electrically heated for freeze protection, while the thermal insulation properties of the layer maximize the collection efficiency of the array and minimize heat loss to the surrounding ground The tube collectors (502) are placed in insulated trays (816) (shown in FIG. 8c) with reflective metal sides. As noted, the tray (816 is mounted at a slight angle to allow water that collects in it to drain off into a drainage system. The tubes (502) are mounted to the bottom of the tray so that vertical pressure from the downwards pressure of a proximal nuclear explosion will not cause the STECs to deflect. The tubes can be interconnected in a serial fashion using metal bellows tubing which allows for some flexure and movement without harming the mechanical integrity and watertightness of the system. The flexible metal bellows tubes are also used to provide resistance from ground movements such as earthquakes or the so-called heave that accompanies some nuclear explosions. This arrangement in effect creates a linear oven that heats the fluid flowing through the collector tubes. The generated heat can be used to spin EMP shielded turbine generators while minimizing heat loss to the surrounding ground. It is noted that the piping interconnects (508), which are may be flexible are also thermally insulated to prevent heat loss between adjacent array elements. Excess heat in the thermal fluid after turbine generation can be used in different ways, such as heating buildings, or running absorptive chillers to cool adjacent buildings or sold to external parties located offsite. Additionally or alternatively, the excess heat can be stored in the sub-surface geothermal reservoir and can be used for deicing the STECs.

In the STEC system, residual heat in the working fluids or from stored heat in the sub-surface geothermal reservoir is circulated through the receiver tubes at night to keep the system components above the freezing point when ambient temperatures fall below about 40 degrees Fahrenheit. Supplemental heat can be added using gas-fired or electrically-heated boilers and heat exchangers or can be supplied directly by passing an electric current through the STEC array piping, in effect turning it into a large resistance heater. FIG. 9 is a plan view showing a plurality of collector arrays with walkway spaces that can be covered with black porous asphalt. As shown, the spaces between exemplary collector arrays (e.g., (902), (904) constitute longitudinal (e.g., (912)) and transverse (e.g., (914)) walkways. This black porous asphalt maximizes the thermal capture while allowing rain water and cleaning water to soak into the ground. This walkways also provide a means for maintenance workers to move around and work on the STECs without having to walk on them but still have easy access for service and maintenance purposes.

To address dirt accumulation from any of multiple sources, a closed loop washing system is integrated into the system which cleans the entire surface of the array on some fixed interval, typically daily. To address thermal loss during periods of little or no sunlight, a sub-surface geothermal reservoir and thermal storage and management system is incorporated in the design. The controls for this and all other aspects of the Hardened Solar Energy Collector System are hardened against damage from EMP. These features, in conjunction with the mounting on a thermally and electrically insulating later as described above optimize both the thermal collection efficiency and the mechanical robustness to withstand mechanical shocks due to proximal explosions.

Figure 6:
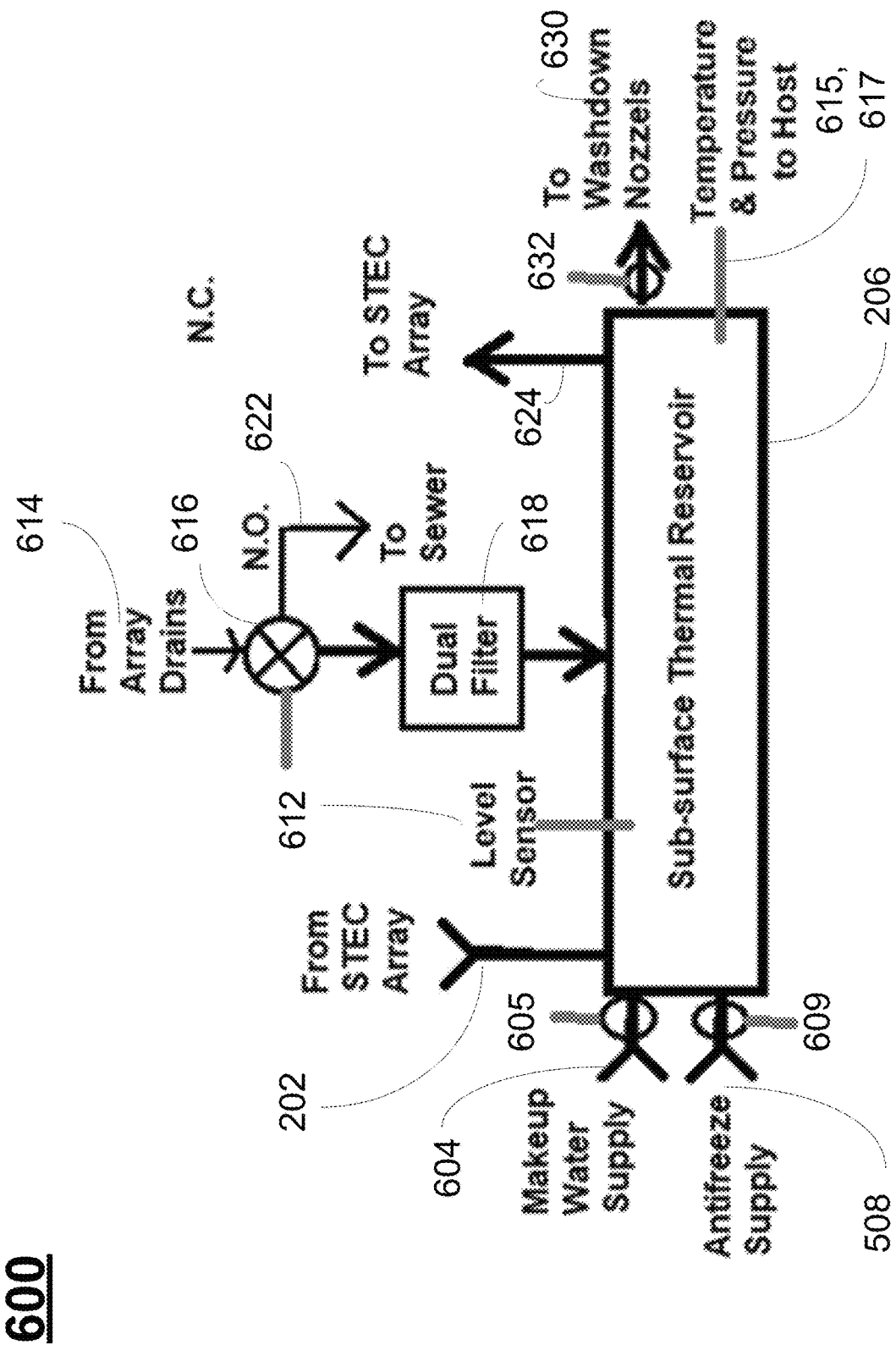
FIG. 6 is a block diagram of an exemplary geothermal and washing sub-system according to an embodiment of the present disclosure.

The STEC system incorporates a sub-surface thermal storage and washing sub-system which is schematically illustrated in FIG. 6. The purpose of the sub-system is to act as a battery for collected thermal energy and to allow it to be released into the primary circulating loop of the at times when there is little or no solar thermal energy being added. The sub-system also enables compensation for periods of cloudiness and nighttime. The system (600) includes the underground geothermal storage unit (206) shown in FIG. 2, which is coupled to receive working fluid from solar collector arrays via interconnect (202). The underground storage unit (206) is also coupled to receive fluid input from a makeup water supply (604), and to an antifreeze supply (608) via respective electronically-controlled valves (605), (609). A level sensor (612) is positioned to measure the volume of working fluid without the storage unit. In addition, a temperature and pressure sensors (615, 617) measure the temperature and pressure of the working fluid within the storage unit. The underground storage unit (206) is also coupled to an array drains (614) which deliver fluid that drains from the collector array, via electronic controlled two-valve (616) either to a dual filter unit (618) and thereby to the storage unit (206), or, alternatively, to a sewer pipe (622). The underground storage unit (206) outputs working fluid back to the solar collector arrays via output interconnect (624) and to washout nozzles (630), via nozzle valves (632).

A system level requirement is to maintain a certain delta-t between the input and output sides of the working fluid circulating loop shown in FIG. 6. It is preferable for the delta-t to be equal to or greater than 20 degrees Fahrenheit in order for the low temperature turbines to operate (i.e., those which do not run on steam). The introduction of heated heat transfer fluid from the sub-surface thermal storage system provides the necessary source of heated heat transfer fluid to maintain operating conditions.

Figure 7:
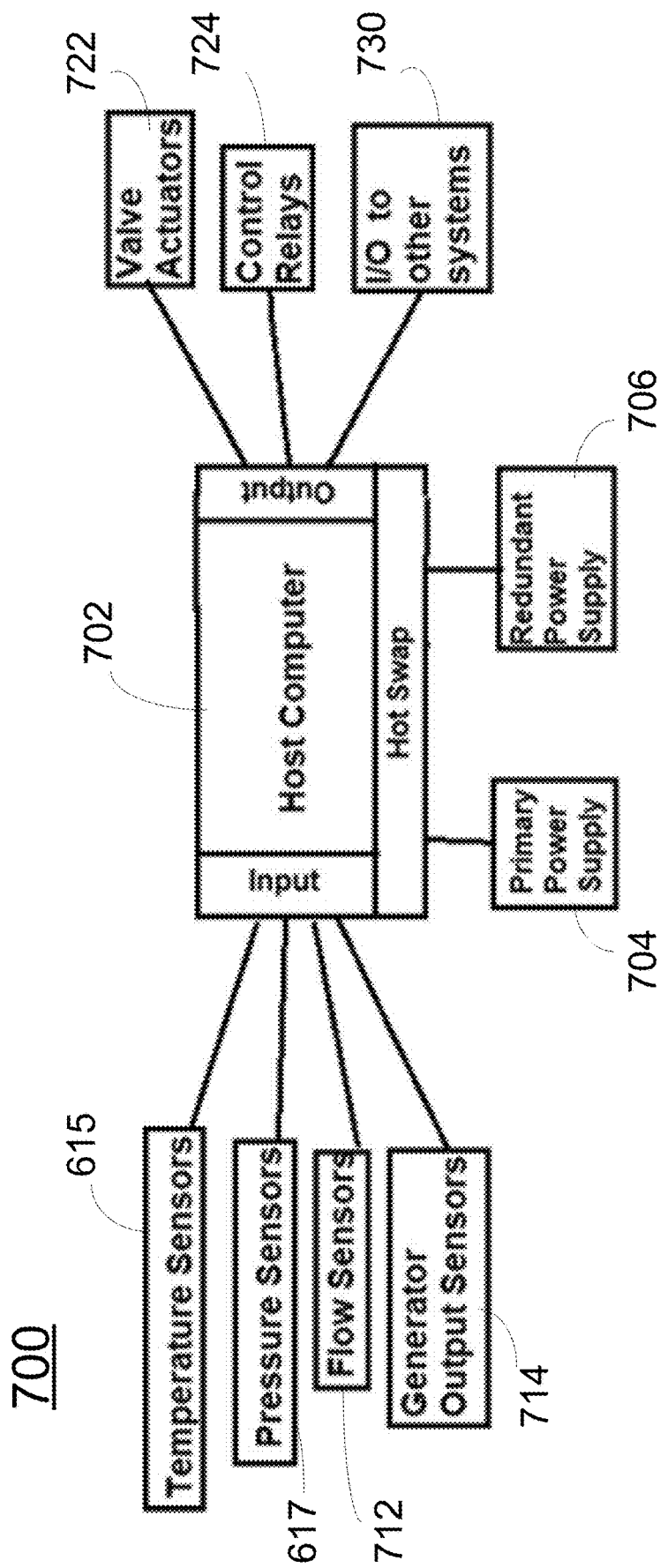
FIG. 7 is a block diagram of a STEC control system according to an embodiment of the present disclosure.

A block diagram of an embodiment of a control system for controlling the STEC system as a whole is shown in FIG. 7. The control system (700) includes a secured host computer (702) that is configured to execute algorithms for regulating the temperature, pressure and level of the working fluid and other relevant control parameters as would be understood by those of skill in the art. The host computer (702) is coupled to receive electrical power from both a primary power source (704) and from a redundant power source (706) to help ensure that host computer is able to receive electrical power from some source even under disastrous circumstances such as the detonation of a nuclear bomb in the vicinity. The host computer (702) receives data input from the level, temperature and pressure sensors (612), (615), and (617) shown in FIG. 6. The host computer (702) also receives data from flow sensors (712) that can be placed through the interconnecting pipes of the system, as well as from generator output sensors (714). The host computer (702) monitors and processes the data received from the sensors in real time and is operative to execute control algorithms for regulating the temperature, pressure, level, flow parameters etc., by outputting control signals to valve actuators (722) and control relays (724). The control algorithm can implement open loop or more preferably closed-loop control. Data communication to external components and systems (730) can also be conducted. For example, when there is an offtake of heated working fluid for the purposes of building or facility heating or cooling (by means of the use of absorptive chillers), the host computer (702) monitors and controls the offtake fluid temperature, flow rate and pressure to maintain them within specified limits.

The control system is hardened against deleterious effects of EMP and mechanical damage from proximal nuclear explosions. There are a number of US Government specifications, collectively referred to herein (see definitions) as TEMPEST. TEMPEST is formally defined as: "Telecommunications Electronics Materials Protected from Emanating Spurious Transmissions" and is both a U.S. National Security Agency specification and a NATO certification referring to spying on information systems through leaking emanations, including unintentional radio or electrical signals, sounds, and vibrations. For the purposes of this document, the definition has been expanded to include all means of hardening and protecting systems from the deleterious effects of proximal nuclear explosions The devices (systems) and methods disclosed herein are configured to protect electronic equipment, electrical components, and systems thereof from hazardous EMI including transient electromagnetic pulses (EMPs). There are many methods of hardening the control electronics. These include, but are not limited to, use of electro-mechanical relay logic, specially shielded enclisures, specially filtered ventilation systems, etc. The choice of method is specific to the particular installation requirement and customer defined requirements.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A hardened solar thermal energy collector (STEC) system adapted to withstand a nuclear detonation or other powerful explosion in the vicinity, the system comprising:
   a plurality of collector tubes arranged side by side in an array that carry and circulate a working fluid, each of the plurality of collecting tubes having an upper radiation collection surface and a bottom surface;
   a supporting tray upon which each of the collector tubes is securely mounted;
   an insulated housing set beneath a ground surface level enclosing the plurality of collector tubes and supporting trays; and
   a hardened underground geothermal storage unit fluidly coupled to the array of collector tubes;
   wherein the housing, the plurality of collector tubes, and the tray are positioned such that topmost portions thereof are at the ground surface level or below.

2. The system of claim 1, wherein each of the plurality of collector tubes are spaced apart from adjacent tubes by between 0.5 and 1 inch.

3. The system of claim 2, further comprising a plurality of pipe interconnections positioned underneath the plurality of collector tubes, each pipe interconnection fluidly connecting a pair of adjacent collector tubes, the positioning of the pipe interconnections beneath the collector tubes enabling a maximizing of collection area of the plurality of the collector tubes.

4. The system of claim 1, further comprising
   a plurality of sensors for determining physical properties of the working fluid;
   a plurality of valve actuators operative to control movement of the working fluid between the plurality of collector tubes and the underground geothermal storage unit; and
   a computing device coupled to the plurality of sensors and the plurality of valve actuators, the computing device being configured to execute program instructions that cause the computer device to receive data from the plurality of sensors, process the data received from the sensors, and to control the valve actuators based on the processing of the received data so as to regulate parameters of the working fluid.

5. The system of claim 4, wherein the plurality of sensors includes working fluid temperature, pressure, fluid level, and fluid flow rate sensors.

6. The system of claim 5, wherein the plurality of sensors further includes an electrical generator output sensor of an electrical generator coupled to the system.

7. The system of claim 1, further comprising a recirculation pump positioned in a fluid path between the array of collector tubes and underground geothermal storage unit.

8. The system of claim 1, wherein the underground geothermal storage unit supplies working fluid to a hardened underground turbine operative to generate mechanical energy from thermal energy stored in the working fluid.

9. The system of claim 8, wherein the secure underground turbine provides mechanical energy to a hardened underground electrical generator.

10. The system of claim 9, wherein each of the plurality of collector tubes has a semi-elliptical cross-section.

11. The system of claim 1, wherein the upper radiation collection surface of each of the plurality of collector tubes has a diffractive optical structure.

12. A hardened solar thermal energy collector apparatus adapted to withstand a nuclear detonation or other powerful explosion in the vicinity, the apparatus comprising:
    a plurality of collector tubes arranged side by side in an array that carry and circulate a working fluid, each of the plurality of collecting tubes having an upper radiation collection surface and a bottom surface;
    a supporting tray upon which each of the collector tubes is securely mounted; and
    an insulated housing set beneath a ground surface level enclosing the plurality of collector tubes and supporting trays;
    wherein the housing, the plurality of collector tubes, and the tray are positioned such that topmost portions thereof are at the ground surface level or below.

13. The apparatus of claim 12, wherein each of the plurality of collector tubes are spaced apart from adjacent tubes by between 0.5 and 1 inch.

14. The apparatus of claim 13, further comprising a plurality of pipe interconnections positioned underneath the plurality of collector tubes, each pipe interconnection fluidly connecting a pair of adjacent collector tubes, the positioning of the pipe interconnections beneath the collector tubes enabling a maximizing of collection area of the plurality of the collector tubes.

15. A method of operating a hardened solar thermal energy collector (STEC) system including a plurality of collector tubes arranged side by side in an array that carry and circulate a working fluid, each of the plurality of collecting tubes having an upper radiation collection surface and a bottom surface, a supporting tray upon which each of the collector tubes is securely mounted, an insulated housing set beneath a ground surface level enclosing the plurality of collector rubes, and a hardened underground geothermal storage unit fluidly coupled to the array of collector tubes via piping interconnects, wherein the housing, the plurality of collector tubes and the try are positioned such that topmost portion thereof are at the ground surface level or below; the method comprising:

detecting physical parameters of the working fluid in the geothermal storage unit; and regulating flow of the working fluid between the array of collector tubes and the geothermal storage unit, as well as between the geothermal storage unit and a turbine to which the geothermal storage unit supplies heated working fluid, based on the detected physical parameters of the working fluid.

16. The method of claim 15, wherein the physical parameters of the working fluid include temperature and pressure.

17. The method of claim 16, wherein the physical parameters of the working fluid further include a level of fluid within the geothermal storage unit.

18. The method of claim 16, further comprising:

receiving data indicating an output of an electrical generator to which the turbine provides mechanical energy;

regulator the flow of the working fluid between the array of collector tubes and the geothermal storage unit, as well as between the geothermal storage unit and a turbine, based also on the data indicating the output of the electrical generator.

\* \* \* \* \*